United States Patent [19]

Negishi et al.

[11] Patent Number: 4,758,441
[45] Date of Patent: Jul. 19, 1988

[54] ODORLESS SOYBEANS

[75] Inventors: Masaaki Negishi, Chiba; Isao Nomura, Sakura, both of Japan

[73] Assignee: Showa Sangy Co., Ltd., Tokyo, Japan

[21] Appl. No.: 701,613

[22] Filed: Feb. 14, 1985

[51] Int. Cl.$^4$ ................................................. A23B 9/00
[52] U.S. Cl. ..................................... 426/465; 426/443
[58] Field of Search ............... 426/443, 460, 461, 506, 426/507, 508, 465, 473, 629, 632, 634, 467

[56] References Cited

U.S. PATENT DOCUMENTS

| | | | |
|---|---|---|---|
| 1,509,076 | 9/1924 | Berczeller | 426/461 |
| 3,290,159 | 12/1966 | Dorsey et al. | 426/460 |
| 4,318,933 | 3/1982 | Miller | 426/460 |
| 4,600,594 | 7/1986 | Bartesch et al. | 426/443 |

FOREIGN PATENT DOCUMENTS 994164  8/1976  Canada .
1385303  1/1973  United Kingdom .

OTHER PUBLICATIONS

Smith et al., 1972, Soybeans: Chemistry and Technology, vol. 1, Proteins, AVI Publishing Co., Inc., Westport Conn., pp. 160–162.

Inglett, 1972, Symposium: Seed Proteins, AVI Publishing Co., Inc., Westport, Conn., pp. 284–291.

Primary Examiner—Donald E. Czaja
Assistant Examiner—Carolyn Paden
Attorney, Agent, or Firm—Birch, Stewart, Kolasch & Birch

[57] ABSTRACT

A process for the preparation of odorless soybeans having a high nitrogen solubility index, wherein whole or rough-divided soybeans are placed on a belt-type carrier means in the form of a uniform thin layer, and are passed through a wet-heat atmosphere under normal pressure and at a temperature of about 60° to 100° C.

2 Claims, 1 Drawing Sheet

ODORLESS SOYBEANS

FIELD OF THE INVENTION

The present invention relates to improvements in the preparation of odorless soybeans. More specifically, the present invention provides a process for the preparation of raw soybeans which are free from any soybean flavor, suffer no deterioration of the soybean protein due to overheating, and have a high nitrogen solubility index (NSI).

BACKGROUND OF THE INVENTION

Soybeans are often called the meat from the field in view of the fact that they comprise foodstuff materials for providing high-quality vegetable protein, and have recently been used to an increasing extent.

A problem which arises when using soybeans as foodstuff materials is their own odor, referred to as the soybean flavor, which is an obstacle to the satisfactory use of soybeans as foodstuff materials.

It is well known in the art that the soybean odor results from a bad-smelling substance produced by the interaction between the enzyme lipoxigenase and unsaturated fatty acids in the presence of oxygen during the grinding of soybeans. This enzymatic action is rapid. Once the bad-smelling substance is produced, it is extremely difficult to remove the adverse influence thereof.

While lipoxigenase can be inactivated by heating, over-heating deteriorates the soybean protein, leading to a marked decrease in the value of the foodstuff materials produced therefrom.

When treating soybeans, therefore, it is required that lipoxigenase be inactivated to a sufficient degree, while keeping the NSI at a high level. However, it is not always easy to determine the heating conditions for simultaneously achieving both of these objects.

It is well known to treat soybeans by exposure to, e.g., an atmosphere of at least 1 atm and at an elevated temperature of as high as 100° C. or more for the inactivation of the lipoxigenase. (See Japanese Patent Publication No. 48-19946, Japanese Patent laid-Open Publication Nos. 48-82052 and 53-29951 as well as Japanese Patent Publication No. 59-44022). Under these conditions, however, the soybean protein deteriorates so easily that the NSI may decrease.

Alternatively, soybeans have been heated under mechanical vibration while being allowed to fall in a tower or column. (See Japanese Patent Laid-Open Publication No. 53-142555). However, insufficient inactivation of lipoxigenase takes place due to the short-pass of the beans during processing, so that the remaining lipoxigenase results in the occurrence of an offensive odor by enzymatic action and inevitably causes the foodstuffs in which such beans are used to be unpalatable.

SUMMARY OF THE INVENTION

In view of the problems encountered in the prior art, a main object of the present invention is to provide a process for the preparation of soybeans wherein lipoxigenase is sufficiently inactivated so as to prevent the occurrence of any offensive odor and to obtain a soybean product having a high nitrogen solubility index.

Accordingly, the present invention is characterized in that whole soybeans or soybeans which have been rough-crushed to about one half (½) to one fifth (1/5) of their original size are placed on a belt-type carrier means in the form of a thin layer, which is passed through a wet-heat atmosphere at a temperature of from 60° to 100° C. under normal (atmospheric) pressure.

BRIEF DESCRIPTION OF THE DRAWING

The present invention will become more fully understood from the detailed description given hereinbelow and the accompanying drawing which is given by way of illustration only, and thus is not limitative of the present invention, and wherein.

DETAILED EXPLANATION OF THE INVENTION

Figure 1:
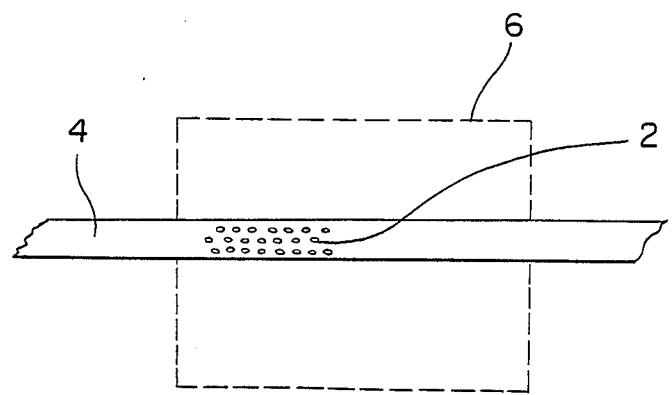
FIG. 1 is a schematic representation of the process of the invention and an apparatus for conducting this process.

As the carrier means, it is preferred to use an endless belt-type means exemplified typically by a belt conveyor, which is best suited for industrial scale mass processing.

When a perforated belt carrier is used as the carrier means, more uniform heating is applied to each soybean grain, since the soybeans thereon are heated from both above and below.

The soybean layer on the carrier means is preferably several centimeters or less in thickness. Particularly satisfactory results are achieved when the layer is 5 cm or less in thickness for example, 1 cm in thickness. Advantageously, the thickness of the layer may be that of a single layer of whole soybeans or roughly divided or crushed soybeans. The soybeans may be used as whole grains or they may be rough-crushed or rough-divided to about 178-1/5 of their original grain size. Depending upon the thickness of the layer, the soybeans may be maintained for about 1-10 minutes in a wet-heat atmosphere when the temperature employed is a range of from 90° C. to 100° C. A processing time longer than about 10 minutes is necessary at a temperature below about 90° C.

The soybeans prepared according to the present invention are post-treated in a known manner, and are used, for example, as full-fat soybean flour, defatted soybean flour, soya milk materials and edible protein materials. However, the soybeans prepared by the present invention are not exclusively limited to these uses.

In accordance with the process of the present invention, the whole or rough-divided soybeans are placed on the carrier means in the form of a relatively thin layer for processing, whereby the soybeans are directly subjected to virtually uniform heating. For that reason, essentially all of the lipoxigenase activity is eliminated from the soybean grains.

Since the soybean grains are subjected to essentially uniform and even processing conditions, it is possible in the present invention to determine the minimum heating conditions required to inactivate the lipoxigenase.

When some lipoxigenase activity remains in the soybean grains, the resulting product tastes bad as a whole, as mentioned above. In the prior art procedures it was necessary to apply excessive heating due to possible uneven heating of the grains. Such excessive heating, however, is unnecessary in the process of the present invention, and thus, the deterioration of protein due to overheating is avoided and a high NSI can be maintained.

As described above, the process of the present invention makes it possible to reconcile the two objectives of inactivation of lipoxigenase and the prevention of protein deterioration. The continuous, industrial scale processing of soybeans is possible according to the process of the present invention, since the soybeans are processed while being carried by means of a belt-type carrier, such as a conveyor belt. This is different from the prior art procedures in which the processes are of the batch type.

In addition, since the soybeans are processed by exposure to a wet-heat atmosphere in the form of a relatively thin layer, a wide surface area of the beans comes into direct contact with that atmosphere and, thus, the processing can be finished within a short period of time, as can be seen from the following examples. This reduction in the processing time is another advantageous feature of the present invention.

A processing temperature of about 90°–100° C. is the most preferable condition for obtaining a satisfactory flavor-removing effect within a fairly short processing time, e.g., 1–10 minutes. However, the process can be operated at a temperature as low as about 60° C. by extending the processing time somewhat longer.

The undesired soybean flavor can be completely removed with a processing time of 45 minutes when the temperature is 60° C., and the time can be shortened by an increase in the processing temperature. Lipoxigenase is inactivated sufficiently by processing for about 45 minutes at 60° C., without deterioration of the protein. From the economical viewpoint, a processing temperature above 80° C. is preferred.

FIG. 1 shows a schematic view of the process of the invention and an apparatus for conducting this process. As described above, the soybeans 2 are placed on a conveyor belt 4 in the form of a relatively thin layer having, preferably, a thickness of up to about 3 cm. The layer of soybeans is then passed through a steamer 6 having a wet-heated atmosphere maintained at normal pressure and a temperature of about 60° to 100° C. Also as discussed above, the belt 4 is preferably a perforated belt so that the soybeans 2 are heated in the steamer both from above and below. Passage of the soybeans 2 through the steamer 6 is regulated to continuously pass the soybeans through the wet-heated atmosphere for about 1–10 minutes.

The present invention will now be explained with reference to the following examples, which are not to be considered as limiting.

EXAMPLE 1

Whole (undivided) soybean grains are placed on an endless belt conveyor substantially in a uniform single layer, and are passed through the body of a steamer for two minutes under normal pressure and at about 97° C. The product is found to have a lipoxigenase activity of 80 units/g and an NSI of 50.5. Its taste is good.

Untreated whole grains are found to have a lipoxigenase activity of 1690 units/g. With reference to taste, a product having a lipoxigenase activity of 100 units/g or less tastes good.

Analysis of lipoxigenase is conducted according to the procedures described by Shibazaki et al. in "Nippon Shokuhin Kogyo Gakkaishi", 20, 415 (1973), as partly modified. This analysis procedure applies to Examples 2 to 6 inclusive herein.

With respect to the relationship between NSI and processability, for instance, doughnuts emit a strong soybean flavor and taste bad when the NSI thereof is 80. However, when the NSI is in a range of about 40–55, doughnuts are free from any soybean flavor, have an increased volume, and are soft and full. With an NSI of about 20, doughnuts become lean and look poor, although they are free from any soybean flavor.

EXAMPLE 2

Whole (undivided) soybean grains are placed uniformly on an endless belt conveyor in a layer about 1 cm in thickness, and are passed through the body of a steamer maintained under normal pressure at a temperature of about 90° C. The processing times are 1, 2, 2.5 and 3 minutes, respectively. The results are set forth in TABLE 1.

TABLE 1

| Processing Time | NSI | Lipoxigenase Activity | Taste |
| --- | --- | --- | --- |
| 1 min. | 65.0 | 800 units/g | Strong soybean flavor |
| 2 min. | 57.5 | 200 | Slight soybean flavor |
| 2.5 min. | 54.0 | 100 | Good |
| 3 min. | 51.2 | 70 | Good |

By processing the soybeans for 2.25–2.50 minutes according to the present invention, the lipoxigenase is sufficiently inactivated, and the NSI is in an appropriate range. The taste is good.

EXAMPLE 3

Whole (undivided) soybean grains are placed uniformly on an endless belt conveyor in a layer of about 3 cm in thickness, and are passed through the body of a steamer maintained under the same conditions as in Example 1. The processing times are 2.25, 3.25 and 5 minutes, respectively. The results are shown in TABLE 2.

TABLE 2

| Processing Time | | NSI | Lipoxigenase Activity | Taste |
| --- | --- | --- | --- | --- |
| 2.25 min. | Upper layer | 59.4 | 400 | Medium soybean flavor |
| | Middle layer | 60.7 | 400 | Medium soybean flavor |
| | Lower layer | 60.0 | 400 | Medium soybean flavor |
| 3.25 min. | Upper layer | 50.8 | 100 | Good |
| | Middle layer | 53.1 | 100 | " |
| | Lower layer | 51.2 | 100 | " |
| 5 min. | Upper layer | 45.8 | 60 | Good |
| | Middle layer | 43.9 | 80 | " |
| | Lower layer | 44.5 | 60 | " |

EXAMPLE 4

Half-divided and dehulled soybean grains are placed uniformly on an endless belt conveyor in the form of a layer having a thickness of about 1 cm, and are passed through the body of a steamer maintained under normal pressure and at a temperature of 95°.

The processing times are 1 and 2 minutes, respectively. The results are shown in TABLE 3.

TABLE 3

| Processing Time | NSI | Lipoxigenase Activity | Taste |
| --- | --- | --- | --- |
| 1 min. | 61.2 | 400 units/g | Strong soybean flavor |
| 2 min. | 55.1 | 100 | Good |

EXAMPLE 5

Half-divided and dehulled soybean grains are placed uniformly on an endless belt conveyor in a layer of about 5 cm in thickness. They are passed through the body of a steamer maintained under the same conditions as in Example 1. The processing times are 2.25, 3.25 and 5 minutes, respectively. The results are set forth in TABLE 4. With a processing time of 3.25 or 5 minutes, good results are obtained.

TABLE 4

| Processing Time | | NSI | Lipoxigenase Activity | Taste |
| --- | --- | --- | --- | --- |
| 2.25 min. | Upper layer | 51.9 | 200 | Slight soybean flavor |
| | Middle layer | 50.9 | 200 | Slight soybean flavor |
| | Lower layer | 51.2 | 200 | Slight soybean flavor |
| 3.25 | Upper layer | 49.2 | 80 | Good |
| | Middle layer | 48.2 | 100 | " |
| | Lower layer | 47.5 | 100 | " |
| 5 min. | Upper layer | 44.0 | 60 | Good |
| | Middle layer | 45.2 | 80 | " |
| | Lower layer | 44.0 | 60 | " |

EXAMPLE 6

Undivided soybeans are placed on an endless belt conveyor in the form of a layer of about 1 cm in thickness, and are passed through the body of a steamer adjusted to 60° C., 70° C., 80° C., and 85° C., respectively. The results are set forth in TABLE 5.

TABLE 5

| Processing Time | NSI | Lipoxigenase Activity | Taste |
| --- | --- | --- | --- |
| 60° C. | | | |
| 10 min. | 76.0 | 800 | Strong soybean flavor |
| 30 min. | 68.5 | 700 | Medium soybean flavor |
| 45 min. | 57.0 | 100 | Good |
| 55 min. | 51.0 | 80 | Good |
| 70° C. | | | |
| 10 min. | 72.0 | 800 | Strong soybean flavor |
| 20 min. | 64.0 | 300 | Medium soybean flavor |
| 30 min. | 55.0 | 100 | Good |

TABLE 5-continued

| Processing Time | NSI | Lipoxigenase Activity | Taste |
| --- | --- | --- | --- |
| 40 min. | 48.0 | 80 | Good |
| 80° C. | | | |
| 10 min. | 68.0 | 800 | Strong soybean flavor |
| 15 min. | 60.0 | 400 | Medium soybean flavor |
| 20 min. | 54.0 | 100 | Good |
| 25 min. | 51.0 | 80 | Good |
| 85° C. | | | |
| 10 min. | 59.0 | 300 | Medium soybean flavor |
| 15 min. | 52.8 | 100 | Good |
| 20 min. | 50.1 | 80 | Good |

As can be seen from the foregoing results, delicious soybeans having a satisfactory NSI can be obtained by wet-heating treatments at 60° C. for 40 min. or longer, at 70° C. for 30 min. or longer, at 80° C. for 20 min. or longer, and at 85° C. for 15 min. or longer.

Taken altogether, the present invention is feasible even at a processing temperature of approximately 60° C. However, a more suitable processing temperature is preferably no less than 80° C. with workability, efficiency, economics and like factors in mind.

It is to be noted that treatment at a temperature of less than 60° C. is impractical, since processing at such a low temperature takes a great deal of time in order to achieve the beneficial effect of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A soybean product prepared by the process which comprises passing a substantially uniform thin layer of soybeans having a thickness of about 1 to 5 cm by continuous conveyor means through a wet heated atmosphere under normal pressure, at a temperature of 100° C. or less, for about 2.5 to 55 minutes, said soybean produced having a nitrogen solubility index (NSI) of about 40 to 57 and a lipoxygenase activity of 200 or lower.

2. A soybean product according to claim 1, wherein said temperature ranges from 80° C. to 97° C.

* * * * *